United States Patent [19]

Strueh

[11] 4,429,708

[45] Feb. 7, 1984

[54] FLUID FLOW CONTROL

[75] Inventor: Timothy C. Strueh, Lafayette, Ind.

[73] Assignee: TRW Inc., Cleveland, Ohio

[21] Appl. No.: 311,183

[22] Filed: Oct. 14, 1981

Related U.S. Application Data

[63] Continuation of Ser. No. 23,024, Mar. 22, 1979, abandoned.

[51] Int. Cl.³ ............................................. F16K 31/02
[52] U.S. Cl. ..................................... 137/117; 91/448;
137/596.12; 137/596.16; 251/30; 251/44;
417/300; 417/310
[58] Field of Search ...................... 137/117, 489, 489.3,
137/490, 596.12, 596.16, 487.5; 91/448; 251/30,
44, 35, 129, 250; 417/300, 310

[56] References Cited

U.S. PATENT DOCUMENTS

| | | | |
|---|---|---|---|
| 2,569,800 | 10/1951 | Cataldo | 251/129 |
| 2,622,618 | 12/1952 | Ghormley | 251/30 |
| 2,635,636 | 4/1953 | Carson, Jr. | 251/35 |
| 3,195,571 | 7/1965 | Olsavsky | 137/596.12 |
| 3,234,957 | 2/1966 | Allen | 137/596.12 |
| 3,315,316 | 11/1967 | Lewis et al. | 251/30 |
| 3,381,936 | 5/1968 | Allen | 137/117 |
| 3,415,269 | 12/1968 | Salerno | 251/35 |
| 3,462,115 | 8/1969 | Barker | 251/29 |
| 3,495,539 | 2/1970 | Tomita et al. | 417/310 |
| 3,590,873 | 7/1971 | Duff et al. | 251/129 |
| 3,602,104 | 8/1971 | Stremple | 91/448 |
| 3,656,870 | 4/1972 | Kusakabe et al. | 417/300 |
| 3,802,623 | 4/1974 | McIntosh | 251/35 |
| 3,827,453 | 8/1974 | Malott et al. | 137/596.12 |
| 3,924,972 | 12/1975 | Szymaszek | 417/310 |
| 3,976,097 | 8/1976 | Brakel | 91/448 |
| 4,080,110 | 3/1978 | Szymaszek | 417/310 |
| 4,099,893 | 7/1978 | Coffmann | 251/250 |
| 4,121,610 | 10/1978 | Harms et al. | 251/30 |
| 4,126,293 | 11/1978 | Zeuner et al. | 251/30 |

Primary Examiner—George L. Walton
Attorney, Agent, or Firm—Yount & Tarolli

[57] ABSTRACT

A constant displacement pump and an associated flow control mechanism are disclosed. The flow control mechanism includes a variable orifice, i.e., a pintle and valve seat in the outlet from the pump. The pressure drop across the variable orifice controls the position of a bypass valve. The position of the pintle member relative to the valve seat is controlled by fluid pressure acting on one end of the pintle member. The fluid pressure acting on the one end of the pintle member may be infinitely varied so that the position of the pintle member with respect to the valve seat may be infinitely varied. Fluid pressure acting on the one end of the pintle member is controlled by an electrical solenoid which infinitely positions a pilot member relative to a fluid pressure passage joining the opposite ends of the pintle member.

13 Claims, 7 Drawing Figures

FLUID FLOW CONTROL

This is a continuation, of application Ser. No. 023,024 filed Mar. 22, 1979.

BACKGROUND AND SUMMARY OF THE PRESENT INVENTION

The present invention relates to a flow control mechanism for providing a variable fluid flow and, in particular, relates to a mechanism which operates to control flow in response to an electrical signal.

Obviously, fluid flow from a pump can be controlled by a variable orifice, and a valve which maintains a constant pressure drop across the orifice.

In some applications the valve for maintaining the constant pressure drop across the orifice can be a bypass valve. Commonly a bypass valve ports fluid from the pump outlet directly to the pump inlet. When the orifice area is varied, the change in pressure drop across the orifice is sensed and the bypass valve moves to bypass more or less fluid to thereby maintain the constant pressure drop across the orifice.

Coffman, U.S. Pat. No. 4,099,893 also assigned to TRW Inc. discloses a flow control mechanism as referred to above. It includes a pintle member and a valve seat which together define a variable orifice. The pressure drop across the orifice controls a bypass valve. The pintle member is positioned by an electrically actuated rack and pinion gear arrangement. Obviously, the position of the pintle member depends upon the time interval during which the motor is energized, the inertia of the motor and gear arrangement, etc. Thus accurate control of fluid flow is delayed because of the amount of time required to position the pintle member. Also, it is difficult to accurately position the pintle. This is due to the pintle position being dependent upon the time interval of operation of the motor, which time interval is cumbersome to control. Furthermore, the position of the pintle member may not be known when an adjustment is initiated, since the pintle member does not inherently return to a predetermined position either upon start-up or shutdown.

The flow control mechanism of the present invention is particularly useful for regulating the flow from a constant displacement pump, such as a gear pump. The flow control mechanism may be constructed together with the pump in a single integral unit or may be a separate unit. Basically, the flow control mechanism comprises a variable orifice and a bypass valve which is operated by a pressure differential across the variable orifice. The bypass valve allows a pintle valve to maintain a constant pressure drop across an orifice in the outlet of the pump and thus a desired constant flow to the system. If the orifice size is changed, the rate of flow to the system is changed.

In accordance with the present invention, the variable orifice comprises a valve seat and a pintle which is freely movable relative to the valve seat. The pintle has first and second ends. The first end of the pintle is located proximate the valve seat for restricting fluid flow therethrough to an extent which depends upon the position of the pintle member with respect to the valve seat. Fluid pressure acts on the area of the first end of the pintle. This force urges the pintle away from the seat. A pressure chamber is provided adjacent the second end of the pintle and is supplied with fluid. The pressure in the chamber acts against the area of the second end of the pintle to create a force opposing the force acting against the first end of the pintle. A fluid discharge passage allows fluid to flow from the pressure chamber A pilot member is positionable relative to the discharge passage for regulating the pressure build-up within the chamber. Only a relatively small force is needed to move the pilot member and achieve a proportionate movement of the pintle.

The pilot member is preferably positioned relative to the passage by an electrically operated solenoid having an armature which is operatively associated with the pilot member. The position of the armature, and thus the position of the pilot member, is determined by the electromagnetic force applied to the armature by the coil of the solenoid, acting in opposition to a spring bias. Since the magnitude of this force will depend upon the amplitude of the electrical signal which controls the solenoid, the position of the pilot member with respect to the discharge passage will be directly dependent upon the amplitude of this electrical signal.

The present invention is an improvement in the structure disclosed in U.S. Pat. No. 4,099,893. The pintle member in the present invention is positioned immediately upon the solenoid being energized. Thus, positioning of the pintle is not time dependent, as when the pintle is moved by a motor as in U.S. Pat. No. 4,099,893. Further, in the present invention, the pintle returns to a predetermined position when the solenoid is deenergized. Accordingly, the position of the pintle is known when adjustment is initiated by energization of the solenoid.

BRIEF DESCRIPTION OF THE DRAWINGS

The foregoing and other objects and advantages of the present invention will become more readily apparent from the following description of preferred embodiments of the invention, taken in conjunction with the accompanying drawings wherein.

DESCRIPTION OF THE PREFERRED EMBODIMENT

Figure 1:
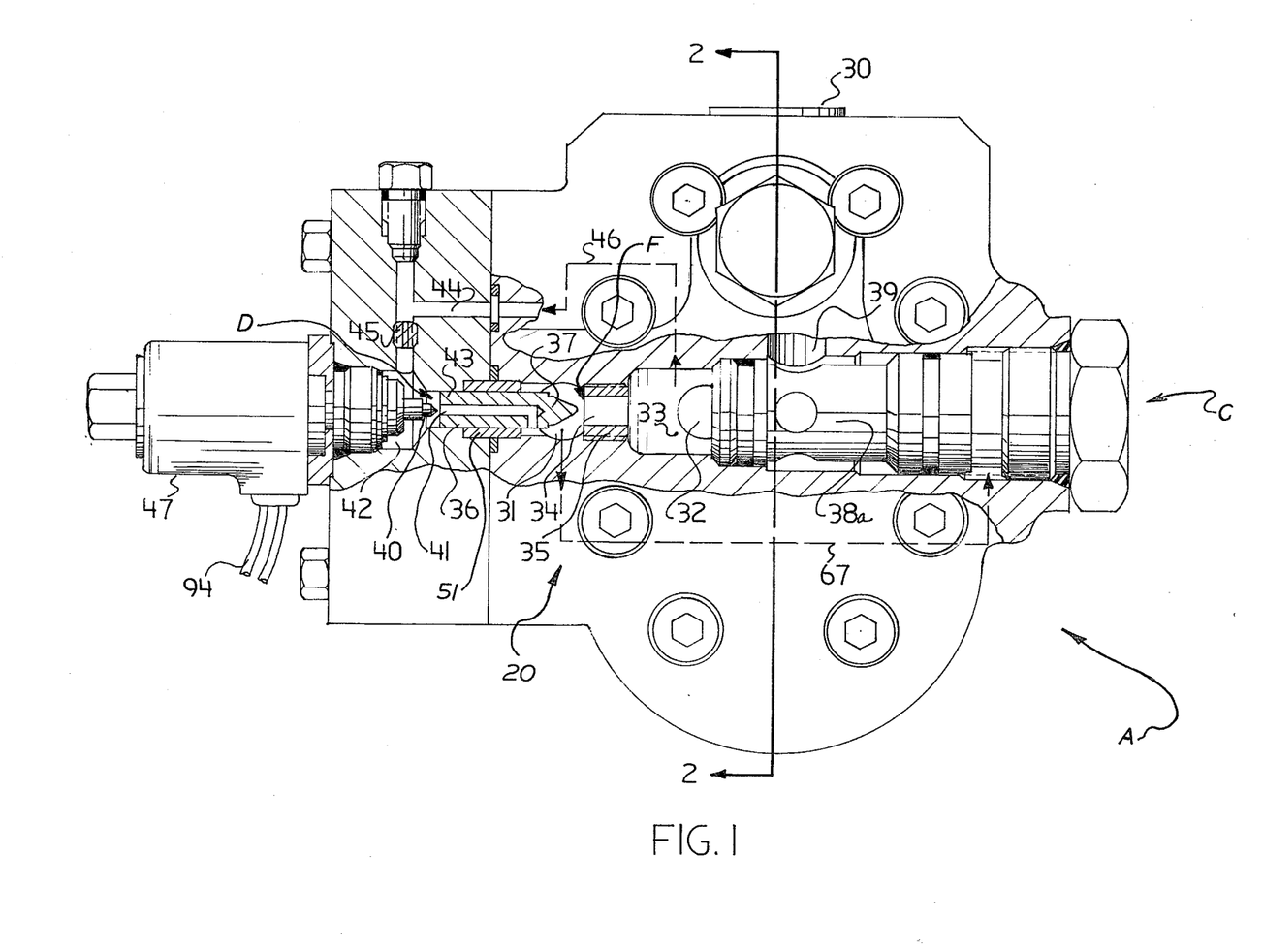
FIG. 1 is an elevational view, partly in section, of a unit embodying the present invention.
Figure 2:
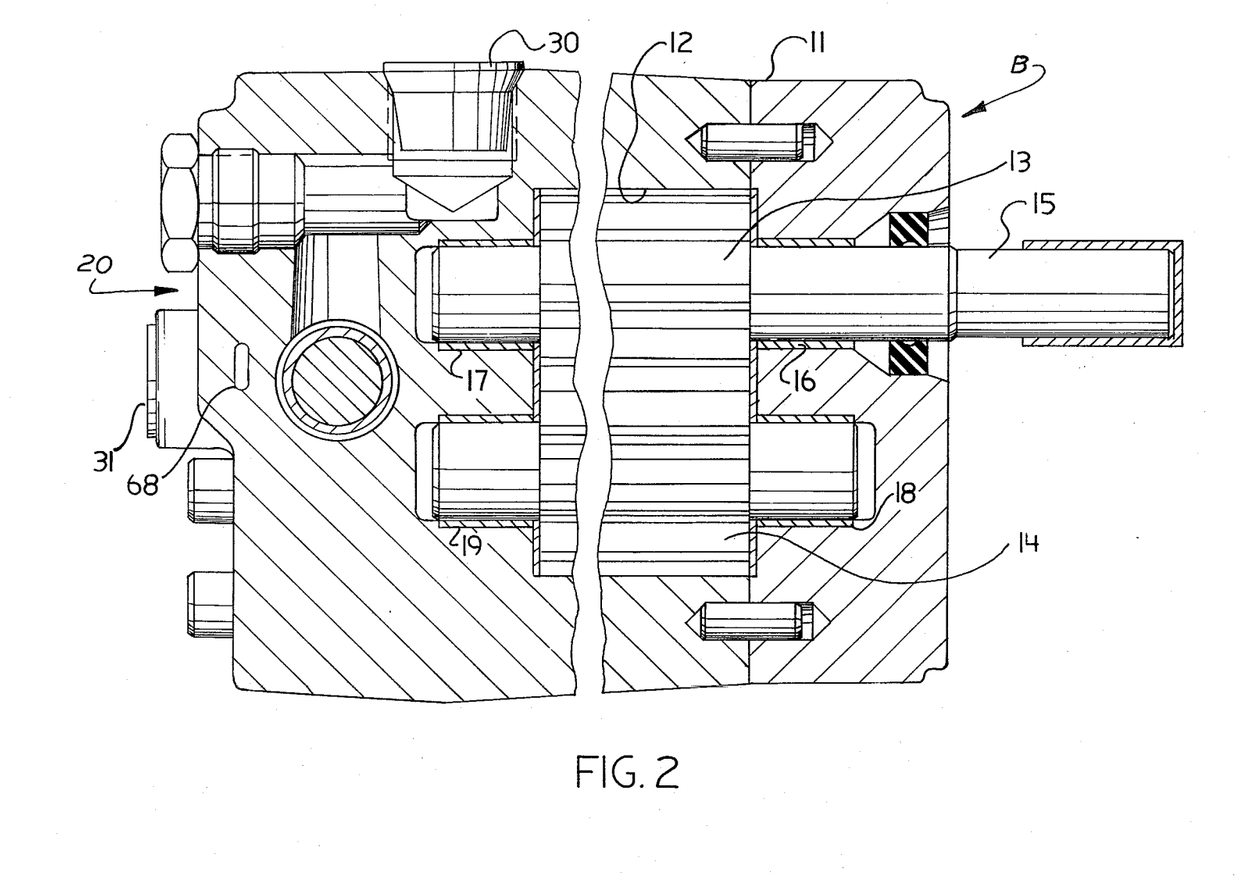
FIG. 2 is a sectional view taken approximately along lines 2—2 of FIG. 1.

FIGS. 1 and 2 show a variable flow pump assembly A. The assembly A includes a constant displacement pump B and a flow control mechanism associated with the pump B. The flow control mechanism includes a bypass valve structure C and a pilot controlled mechanism D. The bypass valve structure C and the pilot controlled mechanism D cooperate to control flow to the fluid system supplied by the pump B.

The pilot controlled mechanism D includes a variable orifice F. Flow from the pump B is controlled by varying the size of the orifice F. The bypass valve structure C regulates the pressure drop across variable orifice F by shunting controlled amounts of fluid from the pump outlet back to the pump inlet.

As shown in FIG. 2, the constant displacement pump B includes a housing 11 which defines a pumping chamber 12. A gear pump mechanism is located in pumping chamber 12 and comprises a pair of gear members 13, 14. The gear member 13 is drivingly connected to an input shaft 15 which is supported by suitable bearings 16, 17 located in the housing 11. The gear member 14 meshes with the gear member 13 and is likewise supported in suitable bearings 18, 19 for rotation relative to the housing 11. The specific structure of the gear pump and bearings and seals may take a variety of different forms, and will not be described in detail since these elements are not important to the present invention.

The pumping chamber 12 communicates with a pump inlet 30 by passages which are not shown. As the gear members 13, 14 rotate at a constant velocity, fluid is drawn from the inlet 30 and is pumped at a constant flow rate to the bypass valve C through a transverse passage 32. The passage 32 communicates with a pump outlet chamber 33 The fluid flows from outlet chamber 33 through the variable orifice F to the system supplied by the pump. The bypass valve structure C bypasses fluid from pump outlet chamber 33 to the pump inlet 30.

The variable orifice F is defined by a valve seat 35 which is threadedly received in the housing 11 and by the tapered nose 37 of a pintle member 36. Pintle member 36 has a generally circular cross-section, and is slidably received within a sleeve 51. The orifice F is varied in size by movement of the pintle member 36 relative to the valve seat 35. Pintle member 36 is freely movable relative to valve seat 35, i.e. is unrestrained by a spring bias or the like. By varying the size of the orifice F, the amount of fluid flow from the pump outlet chamber 33 to outlet chamber 31 is varied. The outlet chamber 31, of course, is connected with the fluid system supplied by the pump.

The shape of the tapered nose 37 of pintle 36 will, in a preferred embodiment, be of a generally paraboloid configuration. When configured in this manner, the flow area of orifice F will be substantially linearly related to the position of pintle 36. The shape of nose 37 may, however, alternatively be selected to be other configurations if different functional relationships between the position of pintle 36 and the resulting flow area of orifice F are desired.

The pintle 36 is moved by fluid pressures acting thereon. The right end of the pintle member 36, as viewed in the drawings is acted on by different pressures. More specifically, due to the tapered shape of nose 37, different sections of the nose will be located different distances from the valve seat 35. Because of this, the fluid pressure acting upon nose 37 will not be constant over the entire surface of the nose. The tip of the nose 37 will be exposed to the greater pressure in the pump outlet chamber 33, with other sections experiencing lesser pressures. The opposite end 43 of the pintle member 36 is acted upon by fluid pressure in a control chamber 42.

Infinite positioning of pintle member 36 is effected by infinitely varying the fluid pressure in the control chamber 42. When the fluid pressure in control chamber 42 is changed, pintle member 36 will be forced, by the resulting differential in the forces acting across it, to a new position wherein the forces acting on the opposite ends thereof are again equal. The pressure in chamber 42 is controlled by means of a pilot member 40 which operates in conjunction with a passage 41. The passage 41 is through the pintle member 36 itself.

The passage 41 in pintle member 36 provides fluid flow communication from chamber 42 to outlet 31. Fluid is supplied from chamber 33 to chamber 42 by means of a passage 44 in the housing. The passage 44 is partially indicated by the dotted line 46. The passage 44 has a flow restriction 45 therein. The flow area of the restriction 45 is selected to be smaller than the unrestricted flow area of fluid discharge passage 41 in the pintle member 36. In a preferred embodiment, passage 44 is drilled into housing 11 parallel to pintle member 36, and behind it (as seen in FIG. 1). For convenience of description, this passage is instead shown rotated 90° out of position so that it lies within the plane of the section of FIG. 1.

When the pintle 36 is in a given steady state position, the pressure drop from chamber 33 to chamber 31 across the variable orifice F equals the sum of the pressure drops across the restriction 45 and pintle 36. Thus, the pressure in chamber 42 is slightly higher than the pressure in chamber 31. The pintle is balanced by the fluid forces acting thereon because, as noted above, the tip of the nose 37 of the pintle projects close to the valve seat 35 and has a higher pressure acting thereon than the pressure down stream thereof. Thus, the pressure gradient acting on the right end of the pintle 36 provides a total force acting on the right end of the pintle which is balanced by the force acting on the left end of the pintle in a steady state condition.

Movement of the pintle member 36 is effected by movement of the pilot member 40. When the pilot member 40 moves toward the pintle member 36, fluid flow through passage 41 is restricted. Pressure in chamber 42 increases and the pintle member 36 moves toward the right in FIG. 1 to restrict flow through orifice F. Movement of the pilot 40 toward the left relative to the pintle 36 results in the pressure in chamber 42 decreasing due to the fact that passage 41 directs more fluid therefrom. The pintle 36, of course, moves to the left or to the right until the fluid pressure acting thereon are balanced.

From the above, it should be apparent that the pilot member 40 need not be capable of acting against the full fluid force applied to the tapered nose 37 of the pintle. Thus, the pintle member 36 is positioned, not by a direct force applied to it by the pilot member 40, but rather by the change in pressure in control chamber 42 which results from a change in position of pilot member 40. Pilot member 40 will generally be pressure balanced so that only a relatively small force is required to reposition it. Control elements may therefore be employed to control the pilot member, and thus fluid flow, whose use would have been impossible without this force amplification feature. The pilot member 40 can, for example, be positioned by a small solenoid or by other moderate sized control elements.

In FIG. 1, a solenoid 47 is included for positioning pilot member 40 relative to pintle member 36. The position of the pilot member 40 is directly related to the magnitude of the electrical current which is supplied to the solenoid 47. If solenoid 47 is fully energized, then the pilot member 40 will be pulled into a fully retracted position (leftward, as viewed in FIG. 1). In this event, the pilot member 40 will provide little restriction of the flow of fluid from chamber 42 into chamber 31 via passage 41. Consequently, fluid will flow from chamber 33 through passage 44 and flow restriction 45 into chamber 42. From chamber 42, the fluid will flow through fluid discharge passage 41 in pintle member 36 and thus into the outlet port 31. Because flow through passage 41 is now unrestricted by pilot member 40, the pressure in chamber 42 will decrease. A force differential will therefore exist across pintle member 36 which will cause it to move to a leftward position so that orifice F will be fully open. Orifice F is shown in this fully open position in FIG. 1.

As the amount of current which is supplied to solenoid 47 is decreased, pilot valve 40 will emerge from solenoid 47 (move to the right as viewed in FIG. 1) and will restrict the flow of fluid from chamber 42 into chamber 31 by increasing amounts. At a given position of pilot valve 40, a given pressure will be built up within chamber 42 due to the flow restriction provided by the pilot valve. Thus, as the pressure within chamber 42 increases, a force differential will build up across pintle member 36 which will cause it to move toward the valve seat 35. As the tapered nose approaches and enters the valve seat, however, it will be subject to increasing fluid pressure due to the higher pressure levels within chamber 33 and the valve seat 35. The pintle member 36 will therefore come to rest at a new position where the forces on opposite ends thereof are equalized.

Likewise, if the pintle 36 is in a steady state condition and the pilot member 40 is moved a small distance to the left, the pressure in chamber 42 will be reduced. The pintle 36 will then move to the left and follow the pilot member 40.

This will result in a positioning of pintle member 36 which is dependent upon the pressure build up in chamber 42. This, in turn, is dependent upon the position of pilot member 40. Consequently, by infinitely varying the amount of current applied to solenoid 47, the position of pintle member 36 may also be infinitely varied, thus providing infinite variation of the amount of fluid flow being provided at the outlet port 31.

As stated previously, a bypass valve structure C is associated with the pilot controlled mechanism D. The bypass valve C regulates the pressure differential across variable orifice valve F. If this bypass valve were not included, a change in the size of orifice F would be accompanied by a change in the pressure differential across it. This change in the pressure differential across the orifice would at least partially counter the change in flow which would have resulted, had the pressure differential remained fixed. This is particularly true in the embodiment presently being described, since pump B has a fixed displacement output at any given pump speed. The pump would therefore try to force the same amount of fluid flow through the variable orifice F, regardless of the size of the orifice F, unless some other path were provided to shunt excess fluid flow away from the variable orifice F. Bypass valve C serves this function.

Figure 3:
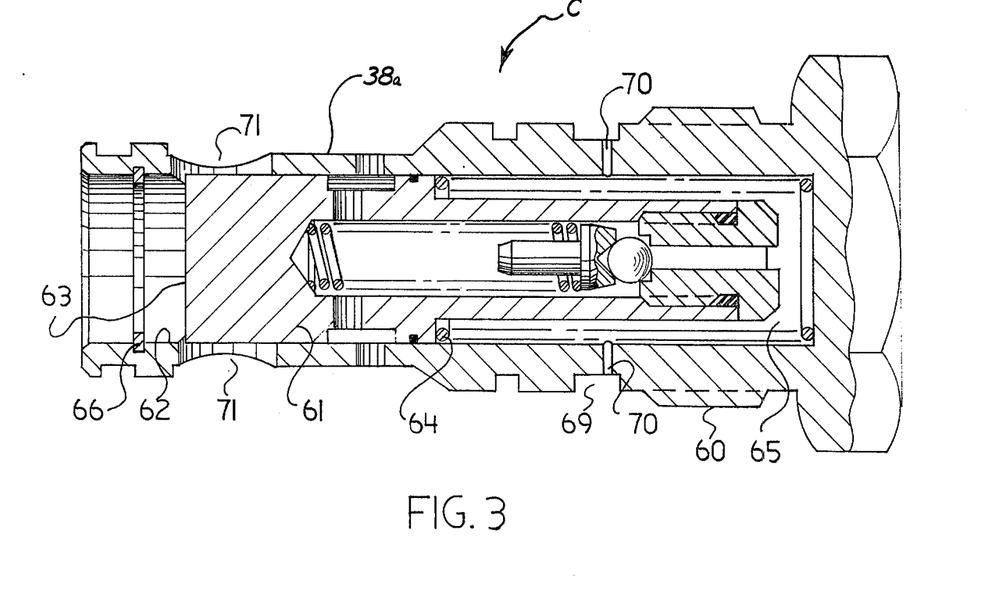
FIG. 3 is a sectional view of a bypass valve structure which is incorporated in the pump unit of FIG. 1.

FIG. 3 is a cross sectional illustration of the bypass valve C. The bypass valve includes a cartridge 38a which is threadedly received in the housing 11. The cartridge 38a has threads 60 thereon which cooperate with corresponding threads in the housing 11. A spool valve member 61 is located in a bore 62 in the cartridge 38a. As shown in FIG. 1, the left end of the cartridge 38a, and therefore the left end face 63 of the spool 61, communicates with the outlet chamber 33 and accordingly outlet pressure acts on this face 63 of the spool valve 61. A spring 64 is located in a chamber 65 at the right end of the spool valve 62 as viewed in the drawings, and biases the spool valve 61 toward the left. When the pump is not operating, spring 64 biases spool valve 61 against a snap ring 66 located in an interior annular groove within the bore 62 of cartridge 38a.

As the pump begins operating, fluid pressure in the chamber 33 will act on the face 63 of the spool valve member 61. Further, a pressure tap, which is indicated by the dotted line 67 in FIG. 1, and which is shown in cross section at 68 in FIG. 2, communicates the pressure from downstream of the variable orifice (i.e. the pressure in the outlet port 31) to the chamber 65. The passage 67 communicates with an annulus 69 formed in the outer periphery of the cartridge 38a. Restricted passages 70 communicate the annulus 69 with the chamber 65.

From the above, it should be apparent that the pressure drop across the variable orifice F is communicated to, and acts across the spool valve 61. Specifically, the pressure in chamber 33 (upstream of orifice F) acts directly on the face 63 of the spool valve, whereas the pressure on the downstream side of orifice F is communicated to the chamber 65 and acts on the right end surfaces as viewed in the drawings of the spool valve. Accordingly, the spool valve 61 will move in bore 62 to a position wherein the pressure drop which occurs across the variable orifice F balances the force generated by the compression of spring 64.

The position of spool valve 61 within bore 62 controls the amount of fluid which is bypassed from chamber 33 to the inlet port 30 of the pump. Thus, cartridge 38a includes passage 71 which communicate with the inlet to the pump by passages 39 (FIG. 1). In FIG. 3, the spool valve is illustrated as occupying a typical control position, wherein the spool valve has partly exposed the passages 71 in the cartridge 38a so that a portion of the fluid flow may be bypassed from chamber 33 to the pump inlet 30 via the passages 39. Because of the operation of this bypass valve, the pressure drop across the variable orifice F will not undergo a major change as the size of the orifice is varied.

The bypass valve structure C also includes a ball check relief valve which is shown in the drawing. The structure, and operation of this valve will not be described herein in detail since it is fully described in the aforementioned co-pending patent application and forms no part of the present application. When the pressure in chamber 65 increases to a point where the ball moves off its seat, chamber 65 is vented. When chamber 65 is vented the spol 61 moves to its full bypass position bypassing a maximum amount of fluid.

Figure 4:
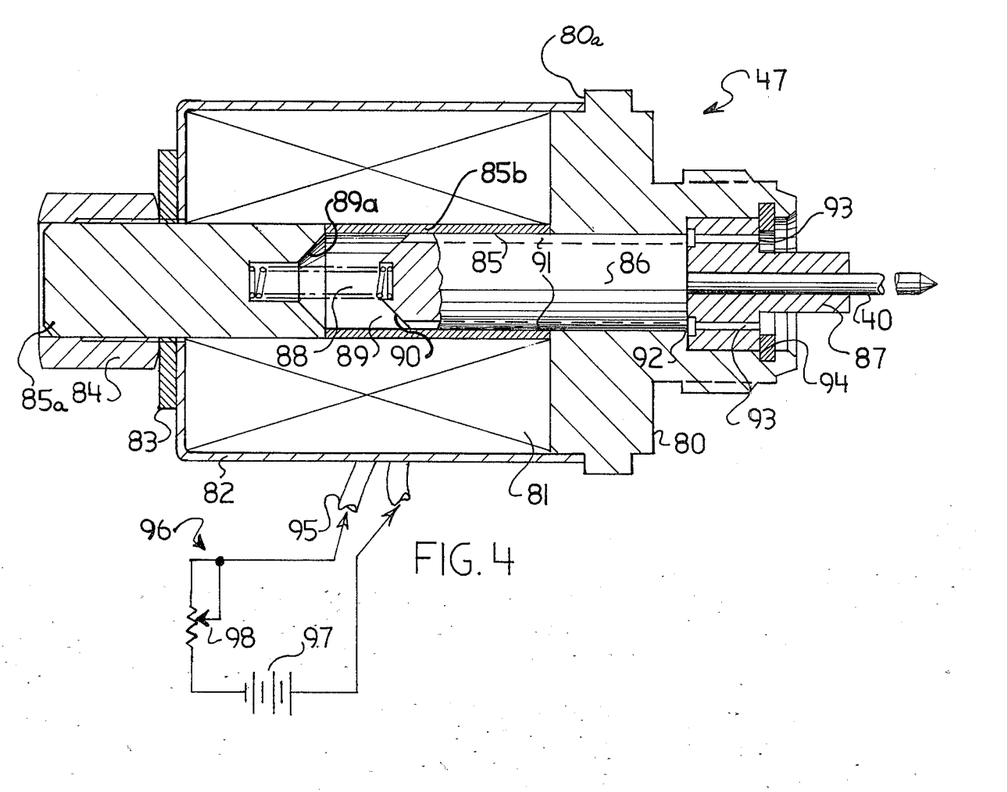
FIG. 4 is a sectional view of the flow control solenoid of FIG. 1.

There is illustrated in FIG. 4 a cross sectional illustration of the solenoid 47 which positions the pilot 40. As seen in FIG. 4, solenoid 47 includes a coil form 80 upon which a coil 81 is wound. An outer casing 82 is secured over the coil windings 81. A washer 83 and a nut 84 which is threadedly received onto the pole piece formed by one end 85a of the coil form 80 hold the casing 82 from movement in one direction (the left in FIG. 4) relative to the coil form 80. The casing is restrained from movement in the opposite direction (the right in FIG. 4) by engagement with a flange 80a on the coil form.

Coil form 80 includes a cylindrical passage 85 which receives a correspondingly shaped armature 86. Pilot member 40 is attached to armature 86, and is thus movable therewith. Armature 86 is resiliently biasd against a seat 87 located at the rightward end thereof, as shown in the drawings, by a spring 88. This results in creation of an air gap 89 between an end surface 89a of the coil form and surface 90 of armature 86. The passage 85 is partially defined by a sleeve 85b of nonmagnetic material located to define the air gap 89. The other parts of the coil form are magnetic. The sleeve 85a functions to force the magnetic lines of flux to flow across the air gap rather than around it.

The armature 86 is pressure balanced by providing longitudinal grooves 91 which communicate with chamber 89 and an annular groove 92 in seat 87. This annular groove 92 communicates with chamber 42 (FIG. 1) by means of passages 93 formed in seat 87. Consequently, when the armature 86 is off seat 87, the pressures on opposite ends of the armature 86 will be equal and will thus have substantially no effect on the positioning of the armature. The positioning of armature 86, and thus of pilot valve 40, will therefore be entirely determined by the electromagnetic action of coil 81 acting in opposition to the resilience of spring 88.

Variable positioning of armature 86 is achieved by connecting the leads 95 of coil 81 to a suitable variable current source 96, illustrated in FIG. 4 as a voltage source 97 connected in series to a potentiometer 98. When no current is supplied to coil 81, spring 88 will bias armature 86 against the seat 87, which is restrained against movement (rightwardly in FIG. 4) by a snap ring 94. As current is supplied to coil 81, the electromagnetic field produced thereby will draw the armature 86 back within the cylindrical passage 85 against the resilience of spring 88, until the force of the spring 88 just balances the electromagnetic forces on the armature. By varying the setting of potentiometer 98 so as to change the amount of current supplied to coil 81, armature 86 (and consequently pilot valve 40) can be infinitely positioned over a predetermined range of positions. Since the position of pilot valve 40 controls fluid flow, the fluid flow will be directly related to the magnitude of the current signal. In other words, for each setting of potentiometer 98, pilot valve 40 and pintle 36 will assume known corresponding positions, and a known fluid flow rate will result. The flow rate may thus be selected simply by placing potentiometer 98 at an appropriate setting.

Figure 5:
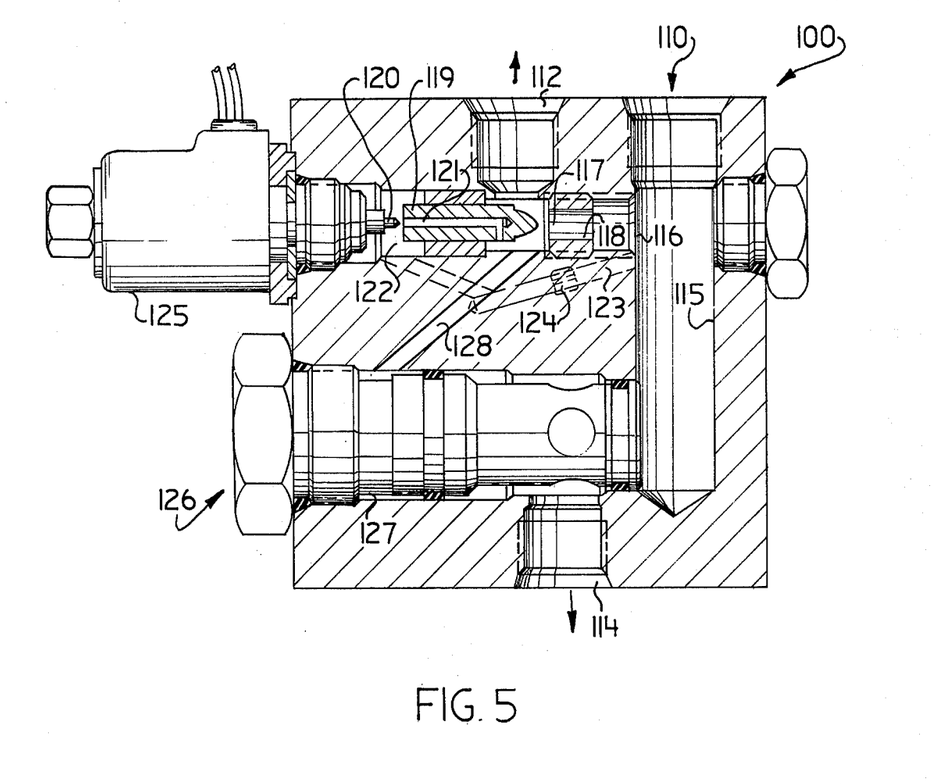
FIG. 5 is a sectional view of a second embodiment of the present invention.

There is illustrated in FIG. 5 an embodiment of the present invention, wherein the variable orifice and the bypass valve are constructed in an assembly 100 which may be located remote from the pump. As shown in this figure, the assembly 100 includes a housing having an inlet port 110, a work port 12, and a bypass port 114 in communication with the pump inlet. The fluid passes from the inlet port 110 to a passage 115 which communicates with a second passage 116. Passage 116 communicates with a variable orifice 117 defined by a valve seat 118 and a pintle member 119. The opening of the variable orifice is controlled by varying the position of pintle member 119.

As in the embodiment of FIG. 1, pintle member 119 is positioned by means of pilot member 120 coacting with a passage 121 in the pintle member 119. Passage 121 serves to communicate fluid pressure from chamber 122 back to the work port 112. Chamber 122 is supplied with fluid by means of a passage 123 containing a flow restriction 124 therein. Pilot member 120 is positioned relative to passage 121 by varying the current supplied to a solenoid 125. This alters the pressure within chamber 122, thus effecting the infinite positioning of the pintle member 119. Also, the pressure drop across orifice 117 is again maintained substantially constant by means of a bypass valve, indicated at 126. This bypass valve may be essentially identical to that shown in FIG. 3. Thus, pressure at the inlet side of orifice 117 is communicated to one end of the spool valve of the bypass valve 126 by means of passage 115, whereas fluid pressure at the outlet side of variable orifice 117 is communicated to annulus 127 by means of a passage 128. This pressure is communicated to one end of a valve spool as in the embodiment of FIG. 1. This pressure differential controls the position of the spool member, and thus also controls the selective bypassing of fluid from the inlet port 110 to the bypass port 114.

It should thus be appreciated that a flow control mechanism has been described wherein the flow through an orifice is infinitely varied by changing the position of a pintle member, and wherein the position of the pintle member is varied by varying the fluid pressure applied to one end thereof. Furthermore, this fluid pressure is varied by means of an electromagnetic solenoid which infinitely varies the position of a pilot valve with respect to a pressure discharge passage carried in the pintle member.

Figure 6:
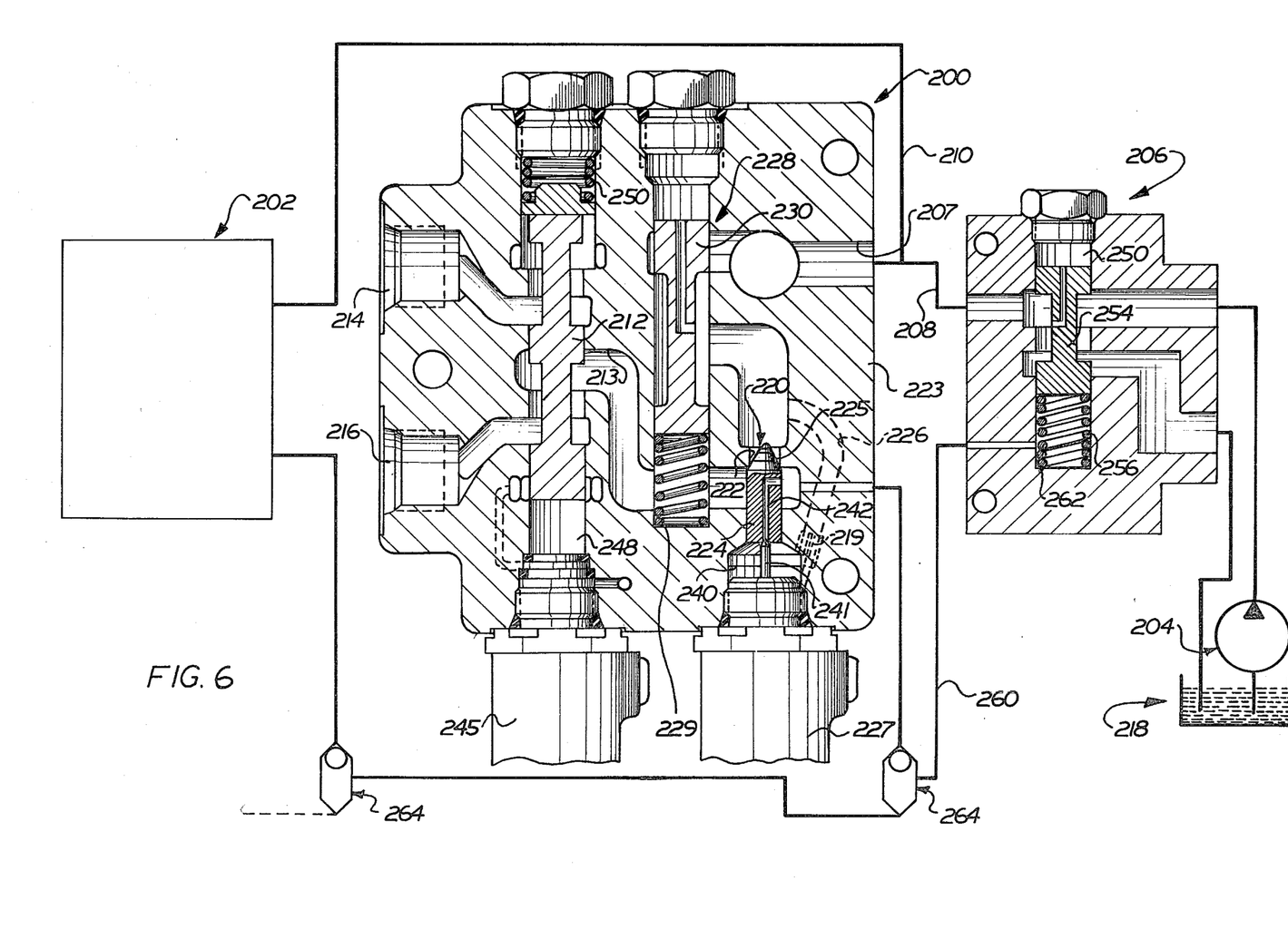
FIG. 6 is a sectional view of still another embodiment of the present invention.

FIG. 6 shows a further modification of the present invention. FIG. 6 illustrates schematically a valve stack having individually actuatable valve assemblies 200, 202 etc. for controlling flow from a single fixed displacement pump 204 to respective working motors (not shown).

Flow from the pump 204 to the valve stack is through a single unloading valve 206. Flow from the unloading valve 206 is directed to the inlet 207 of valve assembly 200 through conduit 208. A branch conduit 210 directs flow from the unloading valve to the inlet of valve assembly 202. Thus, the valve assemblies 200, 202 are in parallel.

Each valve assembly has the construction of the valve assembly 200. The valve assembly 200 includes a directional control valve 212 which directs fluid from a conduit 213 to and from a pair of working ports 214, 216 connected to opposite chambers of a fluid motor (not shown). In the position of the valve 212 shown in FIG. 6, flow is directed from conduit 213 to working port 216, and flow from the other working port 214 is directed to the reservoir 218 by a passage not shown.

A flow control mechanism 220 is located upstream of the directional control valve 212. The flow control mechanism 220 comprises a fixed opening 222 formed in the valve housing 223 and a pintle member 224 movable toward and away from the fixed opening 222. The pintle member 224 includes a conically shaped end portion 225 which is movable with respect to the fixed opening 222 to form a variable flow control orifice.

A pressure compensating flow control valve 228 upstream of the flow control mechanism maintains a fixed pressure drop across the flow control orifice. Valve 228 comprises an axially movable valve element 230 which is biased by a spring 229 to an open position directing fluid from the inlet 207 to the main flow control orifice. Fluid pressures upstream and downstream of the flow control orifice act across the valve 228 to produce a fluid pressure force in opposition to bias of spring 229. Thus, the valve compensates for fluid pressure variations at the valve inlet 207 to maintain a fixed pressure drop across the flow control orifice.

As with the previous embodiment, a fluid pressure differential acts across the pintle member 224, and a solenoid 227 is operative to infinitely vary the position of the pintle 224 relative to the opening 222 to vary the size of the flow control orifice. Flow upstream of the flow control orifice acts on the conical end 225 of the pintle 224. A conduit 226 directs a flow of fluid through a fixed restriction 219 and into a fluid chamber 240 formed at the other end of the pintle 224. Further, a passage 242 is formed in the pintle valve and extends from chamber 240 to the downstream side of the flow control orifice. In a manner similar to the previous embodiment, the solenoid armature includes a small pintle 241 which is movable with respect to the passage 242 to vary the pressure in chamber 240. This varies the pressure differential across the large pintle 224 and effects movement of the large pintle relative to the fixed opening 222 to control the amount of fluid which flows to conduit 213, and which is directed to one of the working ports by the directional control valve 212.

The position of the directional control valve 212 is also controlled by a solenoid 245. When the solenoid 245 is in a de-energized condition a fluid chamber 248 on one side of the directional control valve 212 communicates with fluid at system pressure (by means not shown). When chamber 248 is at system pressure the fluid pressure moves the valve element against the bias of a spring 250 upwardly as shown in FIG. 6 and fluid is directed from conduit 213 to working port 216, and working port 214 is communicated with the reservoir 218. When solenoid 245 is energized it operates to vent chamber 248 to the reservoir 218 thereby allowing spring 250 to move the directional control valve 212 to the other operating position in which it directs fluid from conduit 213 to working port 214, and communicates working port 216 with reservoir 218.

In the position shown in FIG. 6, the solenoid 227 is in a de-energized condition. Small pintle 241 is in a position in which it closes off orifice 232, and the resulting pressure build-up in chamber 240 results in the pintle member 224 closing the fixed opening 222. This results in all system flow being directed to the other valve assemblies 202, etc. When solenoid 227 is energized fluid pressure in chamber 240 is reduced and the pressure differential across the large pintle valve 224 moves the valve to a position allowing a controlled amount of fluid to flow thereby. The valve 228 operates to maintain a fixed pressure drop across the flow control orifice despite pressure variations at the inlet 207. The direction of flow to one working port is controlled by either de-energizing or energizing the solenoid 245.

In a similar manner, each valve assembly 200, 202, etc. is controlled by a pair of solenoids to control the amount and direction of fluid flow therethrough. Of course, while two valve assemblies 200, 202 are shown, the invention can be practiced with different numbers of valve assemblies.

The unloading valve 206, which controls the flow to the valve system, also operates to divert some fluid to reservoir in proportion to an unloading pressure. In the disclosed embodiment, the unloading pressure is set in part by the highest working port pressure. System pressure communicates with a chamber 250 on one side of the unloading valve element 254 to urge the valve element in the one direction. A fluid pressure in a conduit 260 communicates with a chamber 262 on the other side of the valve element 254. A spring 256 disposed in chamber 262 also acts on the valve element 254. Thus, the difference between the pressure in chamber 250 and the combined fluid pressure in chamber 262 and the force of spring 256 sets the unloading pressure.

The fluid pressure in conduit 260 communicates the highest working port pressure in the system to chamber 262. A pilot flow of fluid from the downstream side of the flow control orifice of each valve assembly communicates with conduit 260 through a respective check valve 264. The highest working port pressure communicates with conduit 260, while maintaining all other check valves 264 closed. Thus, the unloading pressure applied to valve element 254 is in proportion to the highest working port pressure of the system.

Figure 7:
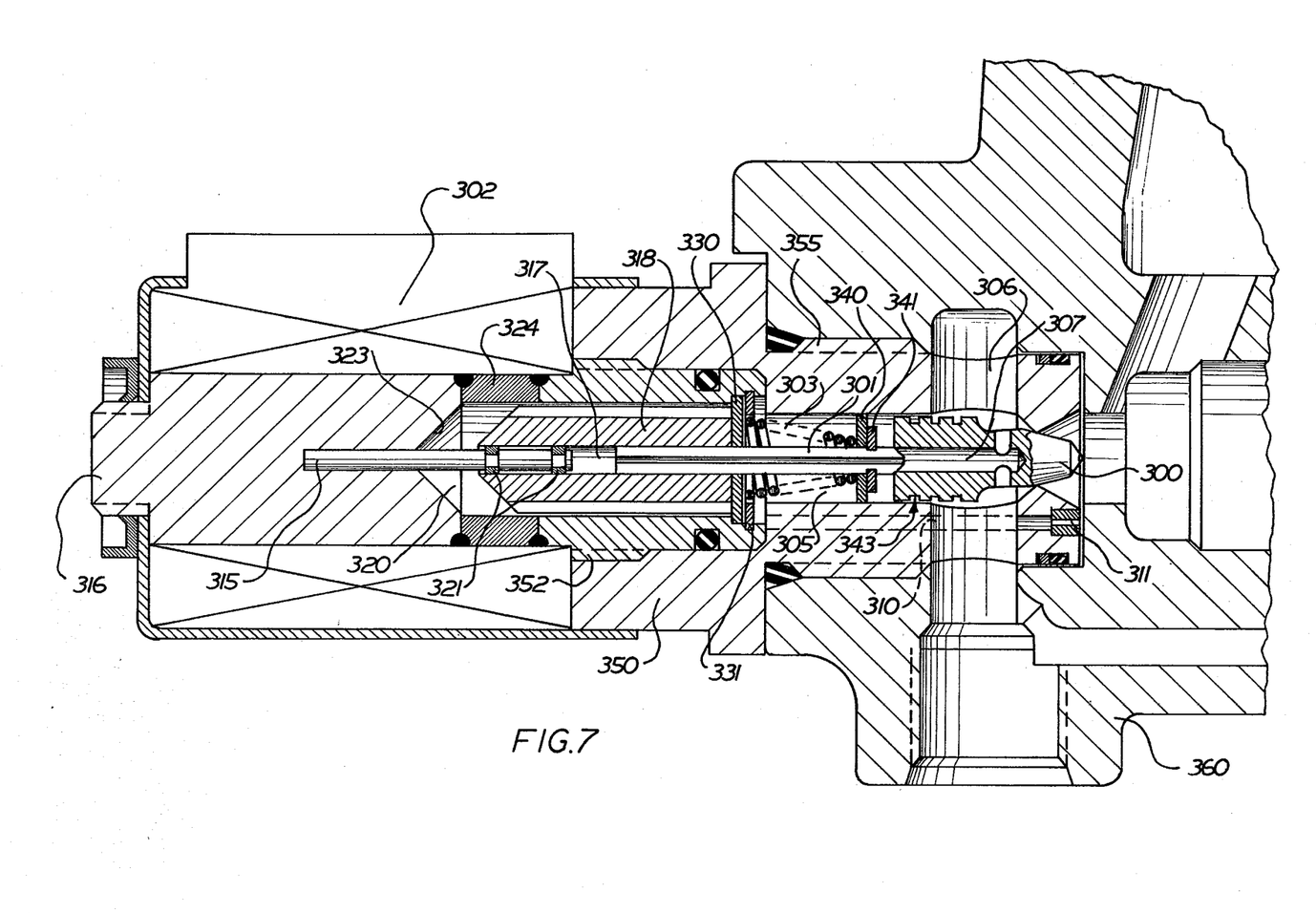
FIG. 7 is a sectional view of still a further embodiment of the present invention.

A further embodiment of the present invention is shown in FIG. 7. The embodiment of FIG. 7 functions in the same manner as the embodiment of FIG. 1. However, the flow control valve in the embodiment of FIG. 7 is in a compact cartridge form.

The embodiment shown in FIG. 7 includes a pintle member 300 and a pilot member 301. The pilot member 301 is press fit into an armature 318 which is moved by a solenoid 302. The pilot member 301 is biased by a spring 303 into engagement with the pintle 300, as shown in FIG. 7, when the solenoid 302 is not energized. When the solenoid 302 is energized, the pilot member 301 will move away from pintle 300. This provides for fluid communication between the chamber 305 and the outlet chamber 306 through the passageway 307 in the pintle member 300. As shown in FIG. 7, a suitable fluid flow passageway 310 (shown in FIG. 7 out of position to simplify the drawing) is provided for directing the pump output pressure into the chamber 305. An orifice 311 is located in that passageway. The orifice 311, of course, functions in the same manner as the orifice 45 in the embodiment of FIG. 1.

A suitable guide member 315 is connected with a coil form 316 and extends into a passageway 317 in the armature 318. Suitable bearings 321 are provided between the guide member 315 and the armature 318 so as to guide movement of the armature.

When the coil 302 is energized, lines of flux are directed through the air gap 320 and attract the armature 318 toward the surface 323 of the coil form. A sleeve of nonmagnetic material 324 is interposed in the coil form, which is otherwise magnetic, so as to concentrate the lines of flux so that they extend through the air gap 320.

The spring 303 which biases the armature 318 and the pilot member 301 toward the pintle member 300 acts between a wear disc 330 which is mounted in place on the coil form by a snap ring 331 and a spider 340 which is mounted in place on the pintle by a snap ring 341. The spider 340 has openings which provide for fluid communication between the opposite sides thereof.

The pintle member 300 in the embodiment of FIG. 7 is a somewhat different construction than the pintle member of the other embodiments. However, details of it will not be described, since they are readily apparent from the drawing. The pintle member 300 is provided with a series of stiction grooves 343 on the outer periphery thereof which minimize the possibility that the pintle member will stick. These grooves 343 enable the pintle member to move easily.

As noted above, the FIG. 7 embodiment primarily differs from the other embodiments in that the assembly is a cartridge-type assembly that can be readily secured in the housing of the pump or unit in which it is located and thus can be easily replaced or assembled in the housing. Specifically, all of the elements described are supported on a common member 350. At the left end of the member 350 is the solenoid 302 which is suitably secured thereto. The coil form 316 projects into the member 350 and is suitably secured therein as by means of a threaded connection therewith, designated at 352.

The right end of the member 350 is threaded at 355. This threaded projection 355 screws into the pump housing 360. Accordingly, by unthreading the member 350 from the housing 360 the entire assembly of the solenoid and the control valve can be removed for either repair, or replacement.

Although the invention has been described with respect to a preferred embodiment, it will be appreciated that various rearrangements and alterations of parts may be made without departing from the spirit and scope of the invention, as defined herein.

What is claimed is:

1. Apparatus comprising a pump for pumping fluid from an inlet to an outlet, means defining a variable orifice in said outlet for regulating fluid flow through said outlet, a fluid bypass valve adjacent to said variable orifice being directly responsive to the pressure drop across said orifice for bypassing selected amounts of fluid from a point upstream of said variable orifice to said inlet so as to cause the pressure drop across said orifice to remain substantially constant as the size of said orifice is varied and if the pressure upstream of the orifice varies, said means defining said variable orifice including a valve seat and a pintle member movable relative to said valve seat between different positions in which said pintle member is spaced from said valve seat to thereby control the size of the orifice, said pintle member having first and second ends, said first end of said pintle member being located proximate said valve seat and being effective to restrict fluid flow through said valve seat to an extent which is dependent upon the position of said pintle member, said pintle member being positioned by the application of a pressure differential acting on said first and second ends thereof, means defining a pressure chamber adjacent to and in fluid communication with said second end of said pintle member, means defining a passage for supplying said chamber with fluid, means defining a fluid discharge passage for directing fluid from said chamber to said first end of said pintle member, a pilot member movable relative to said fluid discharge passage for controllably restricting the rate at which fluid flows from said chamber and thereby controlling the pressure differential across said pintle member and thus the position of said pintle member, and an electrical solenoid operable to position said pilot member in response to an electrical signal applied thereto, whereby variation of the amplitude of said electrical signal results in a corresponding variation in the fluid flow through said outlet.

2. Apparatus as defined in claim 1 wherein said bypass valve and said variable orifice are located in a housing, and further including means in said housing for supporting said pintle member for unrestrained sliding movement relative to said housing.

3. Apparatus as set forth in claim 2 wherein said electrical solenoid infinitely varies the position of said pilot member in response to an infinitely variable electrical signal.

4. Apparatus as set forth in claim 2 wherein said fluid discharge passage passes through said pintle member.

5. Apparatus as set forth in claim 2 wherein said first end of said pintle member has a tapered configuration.

6. Apparatus for controlling fluid flow in a fluid system comprising a housing, a variable orifice in the system and located in said housing, a valve adjacent to said variable orifice and being directly responsive to the pressure drop across said orifice and maintaining the pressure drop across said orifice substantially constant as the size of said orifice is varied and if the pressure downstream of said orifice varies, said variable orifice comprising a valve seat and a pintle valve member movable relative to said valve seat between different open positions in which said pintle valve member is spaced from said valve seat to thereby control the size of said orifice, means in said housing for supporting said pintle valve member for sliding movement relative to said housing, said pintle valve member having first and second surfaces which are oppositely directed and axially spaced apart, said pintle member being positioned by the fluid pressures acting on said first and second surfaces, said first surface being located adjacent said valve seat for controlling fluid flow through said variable orifice, means for applying a fluid pressure to said second surface of said pintle member, a fluid passage communicating the pressure acting on said second surface with the pressure downstream of said variable orifice, and means for varying the fluid pressure acting on the second surface of said pintle member to cause said pintle member to move between open positions with respect to said valve seat, said means comprising a pilot member movable relative to said fluid passage and restricting flow through said passage to a degree depending upon the position thereof, and an electrical solenoid for moving said pilot member relative to said passage to vary the fluid pressure acting on said second surface of said pintle member, whereby variation of the amplitude of said electrical signal results in a corresponding variation in the fluid flow through said variable orifice.

7. Apparatus comprising a pump for pumping fluid from a pump inlet to a pump outlet, means defining a variable orifice in said pump outlet for regulating fluid flow at said pump outlet, a fluid bypass valve adjacent to said variable orifice being directly responsive to the pressure drop across said orifice for bypassing selected amounts of fluid from a point upstream of said variable orifice to said pump inlet so as to cause the pressure drop across said orifice to remain substantially constant as the size of said orifice is varied and if the pressure downstream of the orifice varies, said variable orifice being defined by a valve seat and a pintle member movable relative to said valve seat, said pintle member having first and second ends, one end of said pintle member being located proximate said valve seat and said one end being effective to restrict fluid flow through said valve seat to an extent which is dependent upon the position of said pintle member, said pintle member being positioned by the application of a pressure differential acting on said ends thereof, means defining a pressure chamber adjacent to and in fluid communication with said second end of said pintle member, means defining a passage for supplying said chamber with fluid, said pintle member having a passage therethrough for providing fluid communication from said pressure chamber to said first end, a pilot member movable relative to said passage in said pintle member for selectively restricting fluid flow therethrough and thereby controlling the pressure differential across the pintle member and thus the positioning of said pintle member, and an electrical solenoid operable to position said pilot member with respect to said pintle member in response to an electrical signal supplied thereto, whereby variation of the amplitude of said electrical signal results in a corresponding variation in the fluid flow through said pump outlet.

8. Apparatus as set forth in claim 7 wherein said one end of said pintle member located proximate said valve seat has a substantially tapered shape.

9. Apparatus as set forth in claim 7 wherein said means defining a passage for supplying said chamber with fluid comprises means defining a passage for supplying said chamber with fluid from a point upstream of said variable orifice, and flow restriction means positioned in said passage for restricting fluid flow to said chamber by a selected amount.

10. Apparatus as set forth in claim 7 and further comprising means for supplying an infinitely variable electrical signal to said electrical solenoid.

11. Apparatus for controlling fluid flow comprising a housing, a variable orifice located in said housing, a valve adjacent to said variable orifice and directly responsive to the pressure drop across said orifice and maintaining the pressure drop across said orifice substantially constant as the size of said orifice is varied and if the pressure downstream of said orifice varies, said variable orifice being defined by a surface of a valve seat and a first surface of a pintle valve member, said pintle valve member being movable relative to said valve seat between different open positions in which said first surface of said pintle valve member is spaced from said valve seat to thereby vary the size of said orifice, means in said housing for supporting said pintle valve member for movement relative to said housing, said pintle valve member having a second surface which is oppositely directed and axially spaced from said first surface, said pintle valve member being positioned by fluid pressures acting on said first and second surfaces, means for applying a fluid pressure to said second surface of said pintle valve member, a fluid passage communicating the fluid pressure acting on said second surface with the fluid pressure acting on at least a portion of said first surface, means for varying the fluid pressure acting on said second surface of said pintle valve member to cause said pintle valve member to move between open positions with respect to said valve seat, said means comprising a pilot member movable relative to said fluid passage and restricting flow through said passage to a degree depending upon the position thereof, and an electrical solenoid for moving said pilot member relative to said fluid passage to vary the fluid pressure acting on said second surface of said pintle valve member, whereby variation of the amplitude of said electrical signal results in a corresponding variation in the fluid flow through said variable orifice.

12. Apparatus as defined in claim 11 wherein said first surface of said pintle member defining said variable orifice comprises a tapered surface, and said tapered surface in certain positions of said pintle member projects into said valve seat and has a portion beyond said variable orifice so that the pressure immediately upstream and downstream of the variable orifice acts on said tapered surface.

13. Apparatus as defined in claim 12 wherein said fluid passage communicates with the fluid pressure acting on said tapered surface downstream of said variable orifice.

* * * * *